United States Patent
Clements

(10) Patent No.: US 7,619,104 B2
(45) Date of Patent: Nov. 17, 2009

(54) PROCESS FOR PRODUCING BIODIESEL OR FATTY ACID ESTERS FROM MULTIPLE TRIGLYCERIDE FEEDSTOCKS

(75) Inventor: L. Davis Clements, Portland, OR (US)

(73) Assignee: Renewable Products Development Laboratories, Inc., Portland, OR (US)

( * ) Notice: Subject to any disclaimer, the term of this patent is extended or adjusted under 35 U.S.C. 154(b) by 0 days.

(21) Appl. No.: 11/178,008

(22) Filed: Jul. 8, 2005

(65) Prior Publication Data

US 2006/0224006 A1   Oct. 5, 2006

Related U.S. Application Data

(60) Provisional application No. 60/668,400, filed on Apr. 4, 2005.

(51) Int. Cl.
C07C 51/00 (2006.01)
(52) U.S. Cl. .................. 554/174; 522/1; 422/188
(58) Field of Classification Search ........... 552/1; 554/174; 422/188
See application file for complete search history.

(56) References Cited

U.S. PATENT DOCUMENTS

| | | | |
|---|---|---|---|
| 2,271,619 A | 2/1942 | Bradshaw et al. | |
| 2,360,844 A | 10/1944 | Bradshaw et al. | |
| 2,383,579 A | 8/1945 | Allen et al. | |
| 2,383,580 A | 8/1945 | Arrowsmith et al. | |
| 2,383,599 A | 8/1945 | Glassop | |
| 2,383,601 A | 8/1945 | Keim | |
| 2,383,602 A | 8/1945 | Keim | |
| 2,383,614 A | 8/1945 | Percy | |
| 2,383,632 A * | 8/1945 | Trent | 554/167 |
| 2,383,633 A * | 8/1945 | Trent | 554/167 |
| 2,494,366 A | 1/1950 | Sprules et al. | |
| 3,010,977 A | 11/1961 | Eaves et al. | |
| 4,164,506 A * | 8/1979 | Kawahara et al. | 554/167 |
| 4,608,202 A | 8/1986 | Lepper et al. | |
| 4,652,406 A * | 3/1987 | Lepper et al. | 554/167 |
| 4,698,186 A | 10/1987 | Jeromin et al. | |
| 5,116,546 A | 5/1992 | Klok et al. | |
| 5,354,878 A | 10/1994 | Connemann et al. | |
| 5,399,731 A | 3/1995 | Wimmer | |
| 5,424,466 A | 6/1995 | Stern et al. | |
| 5,434,279 A | 7/1995 | Wimmer | |
| 5,514,820 A | 5/1996 | Assmann et al. | |
| 5,525,126 A | 6/1996 | Basu et al. | |
| 5,849,939 A | 12/1998 | Mittelbach et al. | |
| 6,127,560 A | 10/2000 | Stidham et al. | |
| 6,174,501 B1 | 1/2001 | Noureddini | |
| 6,399,800 B1 | 6/2002 | Haas et al. | |
| 6,489,496 B2 | 12/2002 | Barnhorst et al. | |
| 6,768,015 B1 | 7/2004 | Luxem et al. | |
| 6,822,105 B1 | 11/2004 | Luxem et al. | |
| 6,965,044 B1 | 11/2005 | Hammond et al. | |
| 2003/0083514 A1 | 5/2003 | Boocock | |
| 2005/0204612 A1* | 9/2005 | Connemann et al. | 44/437 |
| 2006/0224006 A1* | 10/2006 | Clements | 554/174 |

FOREIGN PATENT DOCUMENTS

| | | |
|---|---|---|
| GB | 587532 A | 4/1947 |
| WO | WO 03/066567 A1 | 8/2003 |
| WO | WO 2004/029016 A1 | 4/2004 |
| WO | WO 2004/048311 A1 | 6/2004 |

* cited by examiner

*Primary Examiner*—Deborah D Carr
(74) *Attorney, Agent, or Firm*—Schwabe, Williamson & Wyatt

(57) ABSTRACT

Processes and systems for producing biodiesel or fatty acid esters from multiple triglyceride feedstocks are described herein.

12 Claims, 6 Drawing Sheets

PROCESS FOR PRODUCING BIODIESEL OR FATTY ACID ESTERS FROM MULTIPLE TRIGLYCERIDE FEEDSTOCKS

RELATED APPLICATION

This application claims priority to U.S. Provisional Application No. 60/668,400, entitled "Continuous Process For Producing Biodiesel Or Fatty Acid Esters From Multiple Triglyceride Feedstocks" filed Apr. 4, 2005, which is hereby fully incorporated by reference.

TECHNICAL FIELD & BACKGROUND

The present disclosure is related generally to the field of biofuels, and more specifically but not exclusively, to producing monoalkyl fatty acid esters or biodiesel from triglyceride feedstocks.

It is commonly recognized that natural triglyceride sources include some fraction of free fatty acid. Low value materials such as brown grease, trap grease and sewage plant float grease may have free fatty acid contents as high as 80% w/w or more. Triglyceride feedstocks with high free fatty acid fractions are poor starting materials for the production of biodiesel or other fatty acid ester products unless the free fatty acid fraction can be converted to product esters prior to the conversion of the triglycerides into fatty acid esters. In general, methods to convert high free fatty acid feedstocks to biodiesel generally involve multiple steps, extreme temperatures or long residence times, none of which are conducive to a continuous flow process.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that embodiments of the present invention may be practiced with only some of the described aspects. For purposes of explanation, specific numbers, materials and configurations are set forth in order to provide a thorough understanding of the illustrative embodiments. However, it will be apparent to one skilled in the art that embodiments of the present invention may be practiced without the specific details. In other instances, well-known features are omitted or simplified in order not to obscure the illustrative embodiments.

Various operations will be described as multiple discrete operations, in turn, in a manner that is most helpful in understanding embodiments of the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

For simplicity and clarity of explanation, various embodiments of the invention are shown in the figures according to various views. It is to be appreciated that such views are merely illustrative and are not necessarily drawn to scale or to the exact shape.

Furthermore, it is to be appreciated that the actual devices utilizing principles of embodiments of the invention may vary in shape, size, configuration, contour, and the like, other than what is shown in the figures, due to different manufacturing processes, equipment, design tolerances, or other practical considerations that result in variations from one chemical engineering device to another.

Figure 1:
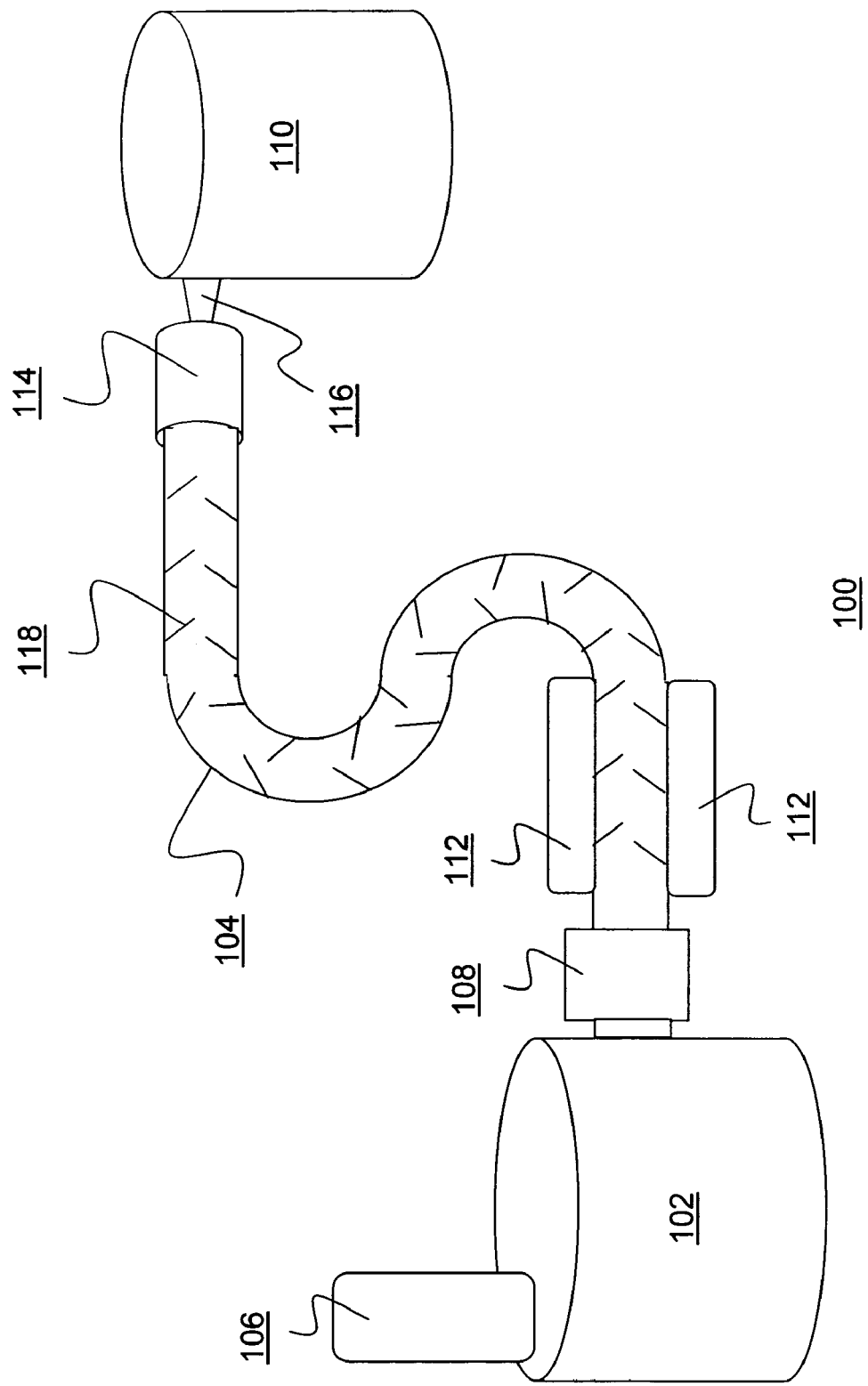
FIG. 1 illustrates a system for producing free fatty acid esters, in accordance with one embodiment of the present invention.

Referring now to FIG. 1, wherein a simplified diagram illustrating a system for producing free fatty acid esters, in accordance with one embodiment, is shown. As illustrated, a system for producing free fatty acid esters 100 includes a first chemical reactor 102 coupled to a second chemical reactor 104. For the embodiment, first chemical reactor 102 is equipped with a condenser 106. In various embodiments, a feed pump 108 is coupled to second chemical reactor 104. Further, system for producing free fatty acid esters 100 includes flash drum 110 coupled to second chemical reactor 104. Additionally, system for producing free fatty acid esters 100 includes:

a heat regulating device 112 coupled to second chemical reactor 104;

a back pressure regulator 114 positioned between second reactor unit 104 and flash drum 110; and a spray nozzle 116 positioned between back pressure regulator 114 and flash drum 110. One or more static mixing elements 118 may be disposed in second chemical reactor 104 to mix the reactants.

First chemical reactor 102 is employed to react a triglyceride feedstock with an alcohol in the presence of an acid catalyst to form an acid-alcohol-water layer and an ester-triglyceride layer. In various embodiments, First chemical reactor 102 may be one or more stirred tank reactors, a tubular reactor or other chemical reactor of the like. In one embodiment, first chemical reactor 102 includes an additional stirred tank reactor to increase the residence time of the reaction and reduce the free fatty acid concentration of the triglyceride feedstock to below approximately 2% w/w.

Condenser 106 is employed to continuously purge alcohol and water from first reactor 102. In various embodiments, condenser 106 is configured to maintain a concentration of water in first reactor 102 in the range of up to 0.5% w/w. In one embodiment, condenser 106 is a total condenser.

Second chemical reactor 104 is employed to react the ester-triglyceride layer with an alcohol in the presence of an alkali catalyst to form an ester phase and a glycerol phase. In various embodiments, second chemical reactor 104 may be a tubular reactor, a plug flow reactor or other chemical reactor of the like. In various embodiments, the dimensions of second chemical reactor 104 are chosen to operate second chemical reactor 104 in a laminar flow regime.

Feed pump 108 is employed to pressurize second chemical reactor 104 and to feed the ester-triglyceride layer product to second chemical reactor 104. Feed pump 108 may be a pump of any type suitable for the particular chemicals.

Flash drum 110 is coupled to the second reactor unit to vaporize and, as a result, separate the alcohol from the ester phase and the glycerol phase. Flash drum 110 may be a flash drum of any type suitable for the particular chemicals.

Heat regulating device 112 is employed to maintain a reaction temperature in second chemical reactor 104. In various embodiments, heat regulating device 112 may be a guard heater or a layer of insulating material.

Back pressure regulator 114 is employed to maintain a reaction pressure in second chemical reactor 104. Back pressure regulator 114 may be a back pressure regulator of any type suitable for the particular chemicals. Spray nozzle 116 is employed to feed the reaction product to flash drum 110 and to initiate vaporization of the alcohol. Spray nozzle 116 may be a spray nozzle of any type suitable for the particular chemicals.

Figure 2:
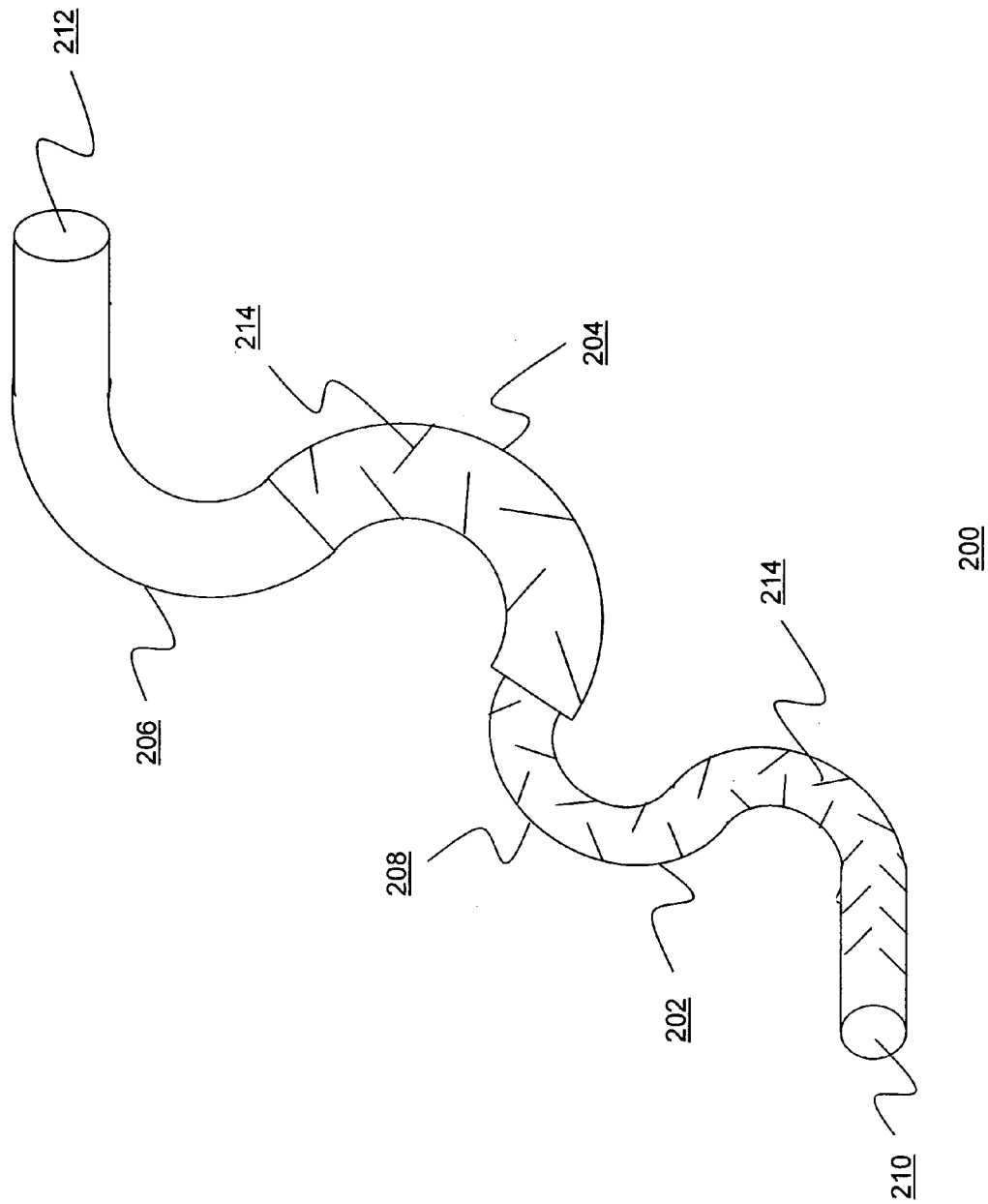
FIG. 2 illustrates a system for producing free fatty acid esters, in accordance with another embodiment.

FIG. 2 illustrates a system for producing free fatty acid esters, in accordance with another embodiment. As illustrated, a system for producing free fatty acid esters 200 includes a first reactor tube 202, a second reactor tube 204 and a third reactor tube 206 sequentially coupled to form a reaction vessel 208. Further, system for producing free fatty acid esters 200 includes an input end 210 and an output end 212. Additionally, chemical reactor system 200 includes static mixing elements 214 disposed in first reactor tube 202 and second reactor tube 204. For the embodiment, third reactor tube 206 is an open tube.

Reaction vessel 208 is employed to react a triglyceride feedstock with an alcohol in the presence of an alkali catalyst to form an ester phase and a glycerol phase. In various embodiments, the triglyceride feedstock may be an ester-triglyceride layer as earlier described in the embodiment of FIG. 3. In various embodiments, first chemical reactor 104 is adapted to vigorously mix the triglyceride feedstock, alcohol and alkali catalyst components. Second chemical 106 is adapted to further react the reaction mixture, but with less mixing intensity. For the embodiment, the diameter of the second reactor tube 204 is larger that the diameter of first reactor 202. Third chemical reactor 106 is adapted to further react the reaction mixture and to allow the separation of the ester phase from the glycerol phase to begin. Resultantly, the reaction is anticipated to be less inhibited by a build up of glycerol product.

In various embodiments, reaction vessel 208 extends vertically such that output end 212 is higher that input end 210. In various embodiments, the reaction vessel is a serpentine tube. In various embodiments, the dimensions of reaction vessel 208 are chosen such that reaction vessel 208 may be operated in the laminar flow regime.

Figure 3:
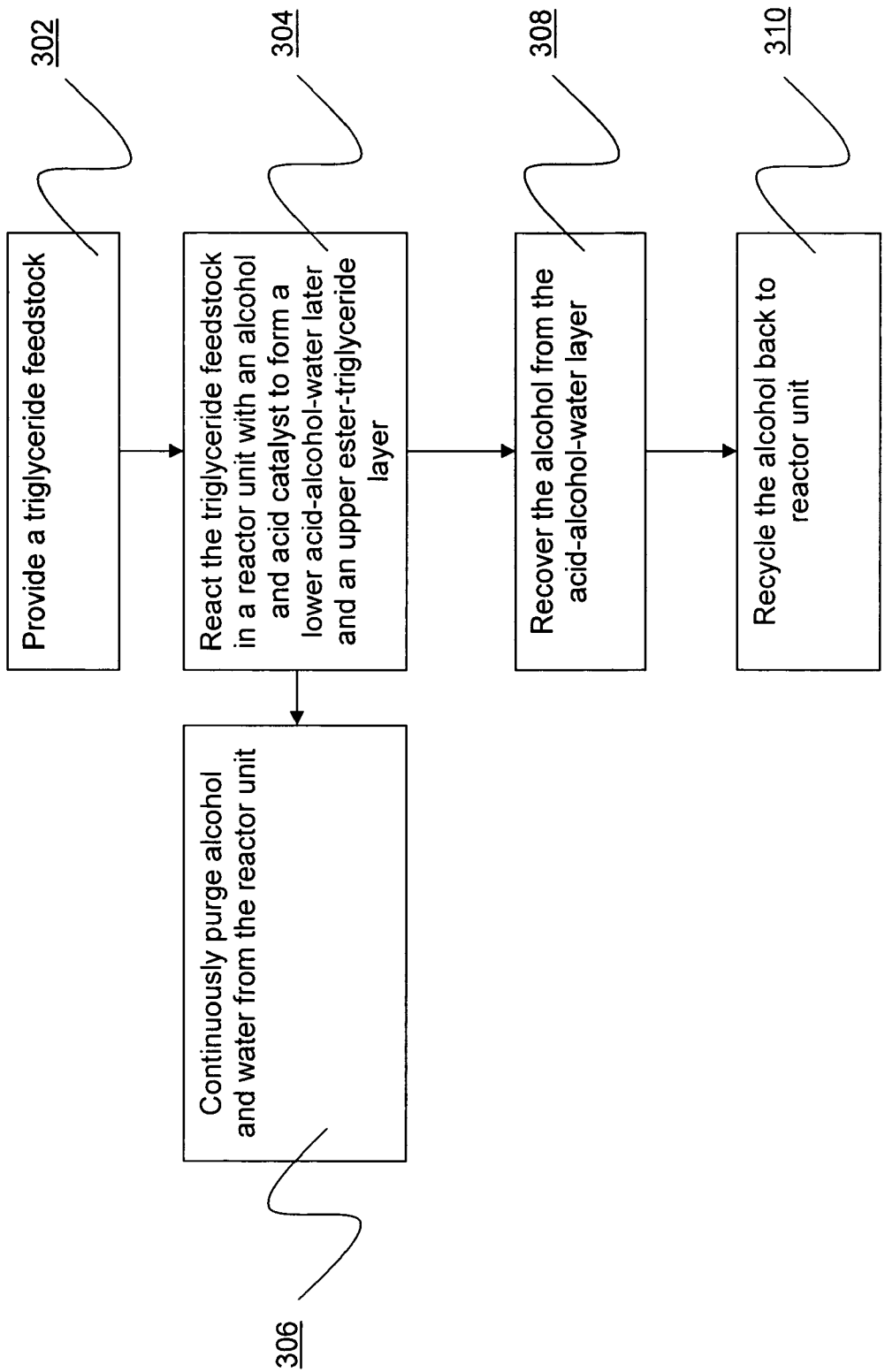
FIG. 3 illustrates another system for producing free fatty acid esters, employing the system for producing free fatty acid esters of FIG. 1, in accordance with an embodiment of the present invention.

Referring now to FIG. 3, wherein a simplified diagram illustrating a method for producing biodiesel, employing the system for producing free fatty acid esters of FIG. 1, in accordance with an embodiment, is shown. As illustrated, a triglyceride feedstock 302 is first provided. Then, at 304, the triglyceride feedstock is reacted in first chemical reactor 102 with an alcohol in the presence of an acid catalyst to form an acid-alcohol-water layer and an ester-triglyceride layer. At 306, alcohol and water are continuously purged from first chemical reactor 102, using condenser 106, to maintain a desired water concentration in first chemical reactor 102. In various embodiments, the water concentration is maintained in the range of up to approximately 0.5% w/w. Then, at 308, the alcohol is recovered from the acid-alcohol-water layer and recycled back into first chemical reactor 102, e.g. re-used at 304.

In various embodiments, prior to reacting the triglyceride feedstock in chemical reactor 102, the triglyceride feedstock may be filtered to about 20 microns to remove insoluble suspended materials. In other embodiments, the triglyceride feedstock may be filtered to even a smaller size, e.g., to about 5 microns. In addition, the feedstock may be dried using spray drying or other methods of the like to a water concentration of approximately 0.5% w/w, or less. The free fatty acid content may be measured using an appropriate test method so that the catalyst and alcohol loadings can be calculated.

In various embodiments, the triglyceride feedstock may be a selected one of used cooking oils, soybean oil, corn oil, cottonseed oil, canola oil, sunflower oil, palm oil, palm kernel oil, coconut oil, peanut oil, olive oil, rapeseed oil, marine oils, linseed oil, beef tallow, pork lard, poultry fat, trap grease, yellow grease, brown grease, oils recovered from oil bleaching clay, soapstock, sewage treatment system float oils and various mixtures of the above. The free fatty acid content may range from substantially zero to 80+% w/w or greater.

In various embodiments, the alcohol may be a selected one of methanol, ethanol, n-propanol, n-butanol and n-pentanol. The acid catalyst may be a selected one of an alkyl acid, aryl acid, alkaryl acid, sulfonic acid and non-volatile mineral acid. The exact composition, including the amount of contribution of each constitute chemical is application dependent. In various embodiments, the concentration of alcohol is in the range of 10-20 mols per mol of free fatty acid. The concentration of acid catalyst is in the range of 0.1-0.5 mol per mol of free fatty acid. As a result, it is anticipated that the acid-alcohol-water layer will be heavier than the ester-triglyceride layer and, thus, will settle to the bottom of first chemical reactor or other similar vessel.

In one embodiment, the alcohol purged from the first chemical reactor 102 at 306 is dried and re-used at 304.

In various embodiments, the triglyceride feedstock may be heated to a reaction temperature before reacting it with the alcohol and acid catalyst. In various embodiments the reaction temperature is in the range of 65 to 100 C. In alternate embodiments, the residence in the first chemical reactor 102 is in a range of 45-90 minutes.

Figure 4:
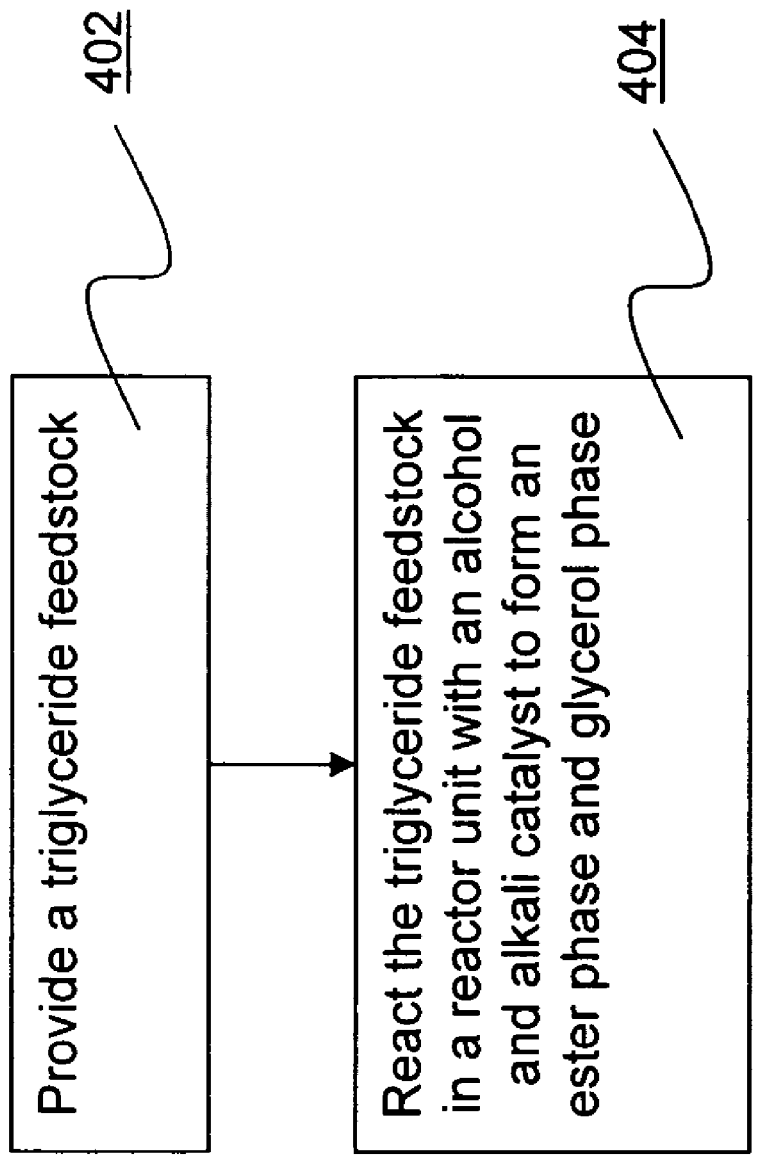
FIG. 4 illustrates a biodiesel production method, employing the system for producing free fatty acid esters of FIG. 1, in accordance with another embodiment of the present invention.

FIG. 4 illustrates another biodiesel production method, employing the system for producing free fatty acid esters of FIG. 1, in accordance with one embodiment. As illustrated, at 402, a triglyceride feedstock is first provided. At 404, the triglyceride feedstock is reacted in second chemical reactor 104 with an alcohol in the presence of an alkali catalyst to form an ester phase and a glycerol phase.

In various embodiments, the triglyceride feedstock may be an ester-triglyceride layer as earlier described in the embodiment of FIG. 3. The alcohol may be a selected one of methanol, ethanol, n-propanol, n-butanol and n-pentanol. The alkali catalyst may be a selected one of oxides, hydroxides and alcoholates of sodium or potassium in a concentrated alcohol solution, (e.g. sodium methoxide in a concentrated methanol solution). The exact composition, including the amount of contribution of each constituent chemical is application dependent. In various embodiments, the concentration of alcohol is in the range of 6-12 mols per mol of triglycerides. In various embodiments, the concentration of alkali catalyst is in the range of 0.25-1.5% w/w sodium hydroxide equivalent of oil.

In various embodiments, the triglyceride feedstock may be heated to a reaction temperature before reacting with the alcohol and alkali catalyst. The reaction temperature may be in the range of 65 to 140 C. In various embodiments, the second chemical reactor 104 is pressurized to a reaction pressure. The reaction pressure may be in the range of 85-150 psig. In one embodiment, the triglyceride feedstock may be dried to a water concentration of less than approximately 0.5% w/w before reacting the triglyceride feedstock with the alcohol and alkali catalyst.

Figure 5:
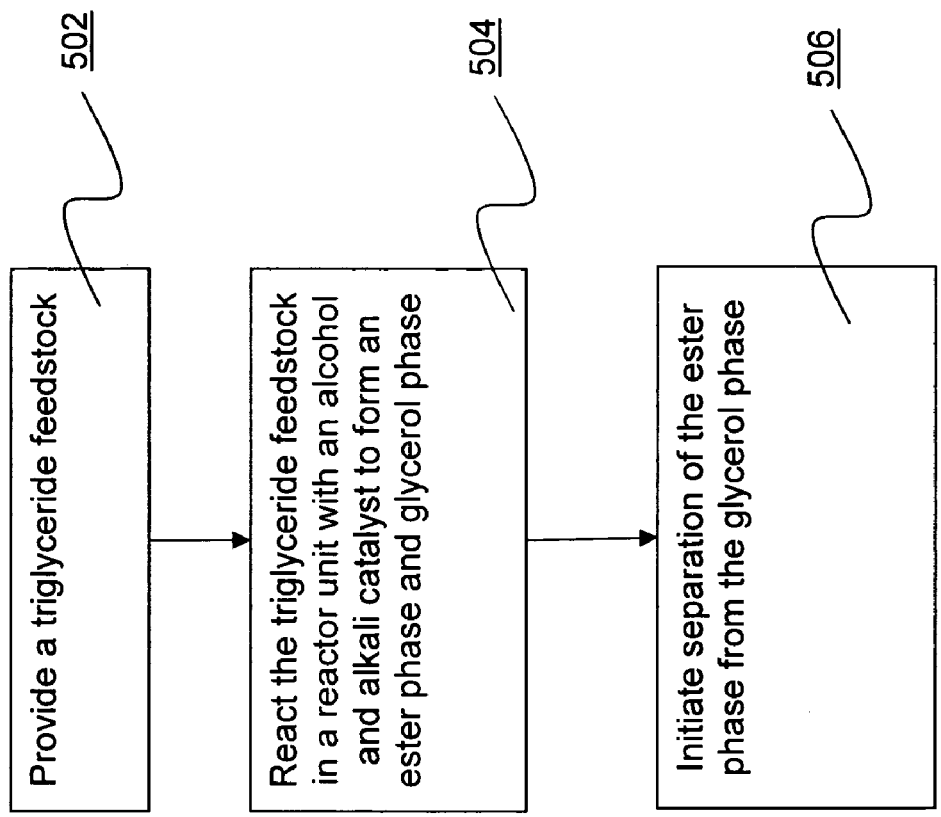
FIG. 5 illustrates yet another biodiesel production method, employing the system for producing free fatty acid esters of FIG. 2, in accordance with another embodiment of the present invention.

FIG. 5 illustrates another biodiesel production method, employing the system of FIG. 2 in accordance with one embodiment. As illustrated, at 502, a triglyceride feedstock is provided. At 504, the triglyceride feedstock is reacted in reaction vessel 208 with an alcohol in the presence of an alkali catalyst to form a reaction product. The reaction product includes an ester phase and a glycerol phase. At 506, the ester phase begins separating from the glycerol phase. In various embodiments, the triglyceride feedstock may be an ester-triglyceride layer as earlier described in the embodiment of FIG. 3.

The residence times for the triglyceride feedstock in first reactor tube 202 and second reactor tube 204 are application dependent. In various embodiments the residence time in reactor tub 202 is in the range of 1-5 minutes. In various embodiments the residence time in second reactor tube 204 is in the range of 5-20 minutes. In various embodiments, a flow rate is chosen to maintain laminar flow conditions in reaction vessel 208.

Figure 6:
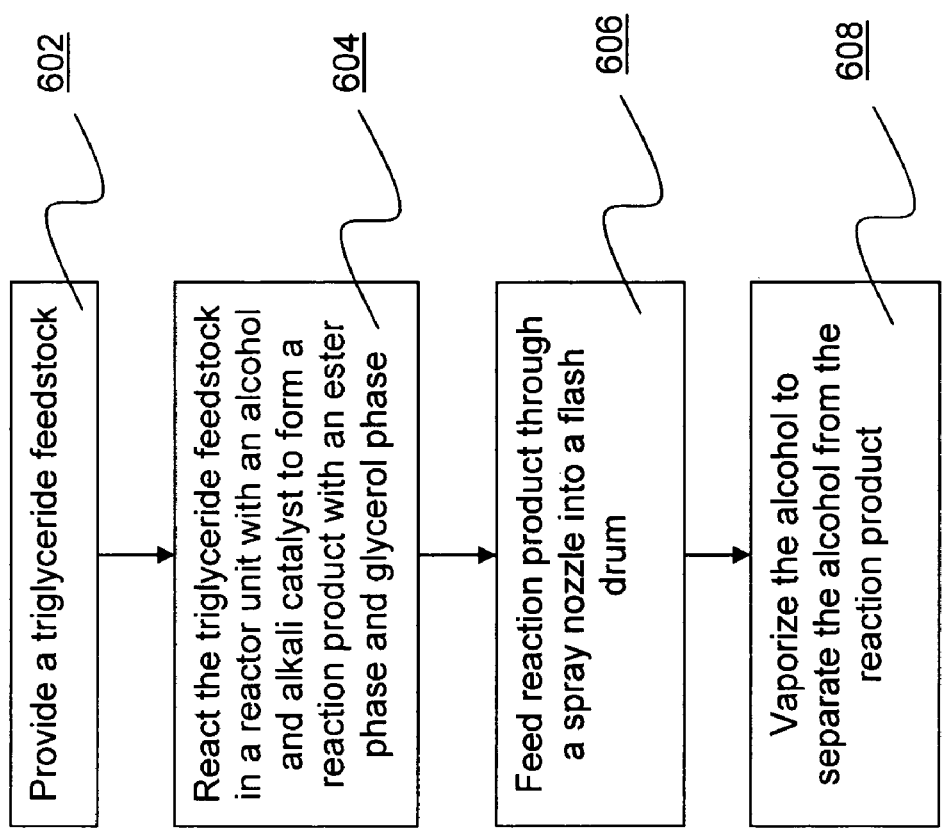
FIG. 6 illustrates yet another biodiesel production method, employing the system for producing free fatty acid esters of FIG. 1, in accordance with another embodiment of the present invention.

FIG. 6 illustrates another biodiesel production method, employing the system for producing free fatty acid esters of FIG. 1, in accordance with one embodiment. As illustrated, at 502, a triglyceride feedstock is provided. At 504, the triglyceride feedstock is reacted in second chemical reactor 104 with an alcohol in the presence of an alkali catalyst to form a reaction product. The reaction product includes an ester phase and a glycerol phase. At 506, the reaction product is fed through spray nozzle 116 into a flash drum 110. Then, at 508, the alcohol is vaporized in a flash drum to separate the alcohol from the reaction product.

The residence time, pressure and temperature for the reaction product in flash drum 110 is application dependent. In various embodiments the residence time in flash drum 110 is in the range of 4-10 minutes. In various embodiments, the pressure in flash drum 110 is in a range of 2-5 psig. In various embodiments, the temperature in the flash drum 110 is in a range of 10-30 C above the normal boiling point of the alcohol. Resultantly, the ester phase is anticipated to be substantially free of the alcohol and the glycerol phase is anticipated to have an alcohol concentration of approximately 13-15% w/w.

Finally, at 510, the ester phase is separated from the glycerol phase in a separator unit. In various embodiments, the separator unit may include one or more of a decanter or a centrifuge. In one embodiment, the residence time in the decanter may be in a range of 5-10 minutes.

CONCLUSION AND EPILOGUE

Thus, it can be seen from the above descriptions, a novel system for producing free fatty acid esters and method have been described. While the present invention has been described in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A process for producing free fatty acid esters comprising:
   providing a triglyceride feedstock;
   reacting the triglyceride feedstock in a reactor unit with an alcohol in the presence of an alkali catalyst to form a reaction product have an ester phase and a glycerol phase, wherein the reacting comprises reacting the feedstock in
      a first reactor tube having a first diameter and at least one static mixing element;
      a second reactor tube coupled to said first reactor tube and having a second diameter and at least one static mixing element, wherein the second diameter is greater than the first diameter; and
      a third reactor tube coupled to said second reactor tube and having an open tube, wherein the first reactor tube, second reactor tube and third reactor tube are sequentially coupled to form a reaction vessel having an input end and an output end, wherein the reaction vessel extends substantially vertically such that the output end is higher than the input end; and
   initiating a separation of the ester phase from the glycerol phase in the reactor unit.

2. The process of claim 1, wherein a residence time for the triglyceride feedstock in the first reactor tube is in a range of 1-5 minutes.

3. The process of claim 1, wherein a residence time for the triglyceride feedstock in the second reactor tube is in a range of 5-20 minutes.

4. A process for producing free fatty acid esters comprising:
   providing a triglyceride feedstock;
   reacting the triglyceride feedstock in a reactor unit with an alcohol in the presence of an alkali catalyst to form a reaction product having an ester phase and a glycerol phase; and
   vaporizing the alcohol in the ester phase of the reaction product at a temperature to separate the alcohol from the ester phase of the reaction product such that the ester phase is substantially free of alcohol but alcohol remains in the glycerol phase, wherein during vaporization the temperature is maintained in a range of 10-30 C above the normal boiling point of the alcohol.

5. The process of claim 4, wherein said vaporizing occurs in a flash drum.

6. The process of claim 5, further comprising maintaining a pressure in the flash drum in a pressure range of 2-5 psig.

7. The process of claim 5, wherein a residence time for the reaction product in the flash drum is in a range of 4-10 minutes.

8. The process of claim 5, further comprising feeding the reaction product into the flash drum through a spray nozzle.

9. The process of claim 4, further comprising separating the ester phase from the glycerol phase in a separator unit.

10. The process of claim 9, wherein the separator unit is a decanter or a centrifuge.

11. A process for producing free fatty acid esters comprising:
   providing a triglyceride feedstock;
   reacting the triglyceride feedstock in a reactor unit with an alcohol in the presence of an alkali catalyst to form a reaction product have an ester phase and a glycerol phase, wherein the reacting comprises reacting the feedstock in
      a first reactor tube having a first diameter and at least one static mixing element, wherein a residence time for the triglyceride feedstock in the first reactor tube is in a range of 1-5 minutes;
      a second reactor tube coupled to said first reactor tube and having a second diameter and at least one static mixing element, wherein the second diameter is greater than the first diameter; and
      a third reactor tube coupled to said second reactor tube and having an open tube, wherein the first reactor tube, second reactor tube and third reactor tube are sequentially coupled to form a reaction vessel having an input end and an output end; and
   initiating a separation of the ester phase from the glycerol phase in the reactor unit.

12. A process for producing free fatty acid esters comprising:
   providing a triglyceride feedstock;
   reacting the triglyceride feedstock in a reactor unit with an alcohol in the presence of an alkali catalyst to form a reaction product have an ester phase and a glycerol phase, wherein the reacting comprises reacting the feedstock in
      a first reactor tube having a first diameter and at least one static mixing element;
      a second reactor tube coupled to said first reactor tube and having a second diameter and at least one static mixing element, wherein the second diameter is greater than the first diameter, wherein a residence time for the triglyceride feedstock in the second reactor tube is in a range of 5-20 minutes; and
      a third reactor tube coupled to said second reactor tube and having an open tube, wherein the first reactor tube, second reactor tube and third reactor tube are sequentially coupled to form a reaction vessel having an input end and an output end; and
   initiating a separation of the ester phase from the glycerol phase in the reactor unit.

* * * * *